Sept. 29, 1970  R. E. BRASIER  3,531,186
THREE-DIRECTIONAL OPTICAL ELEMENT
Original Filed March 8, 1965  2 Sheets-Sheet 1

INVENTOR.
ROBERT E. BRASIER
BY Christensen Santon & Matthews
ATTORNEYS

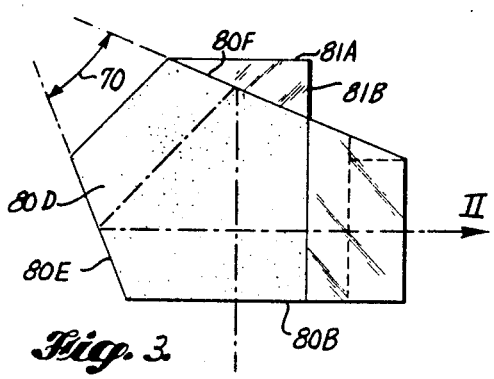
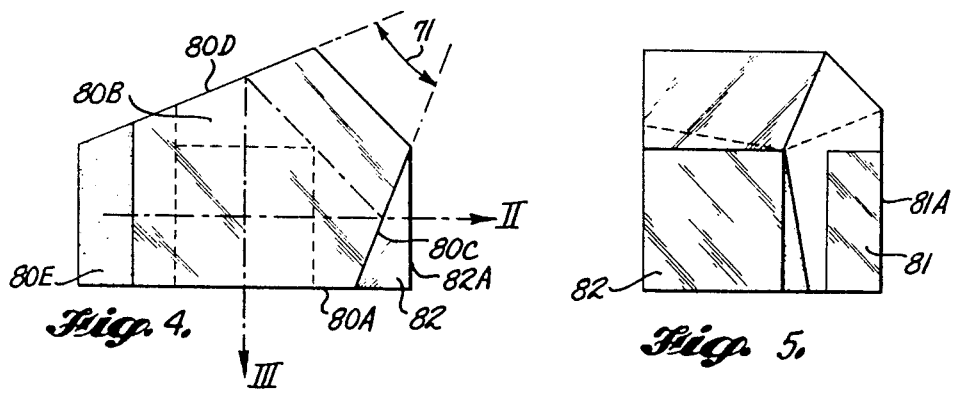
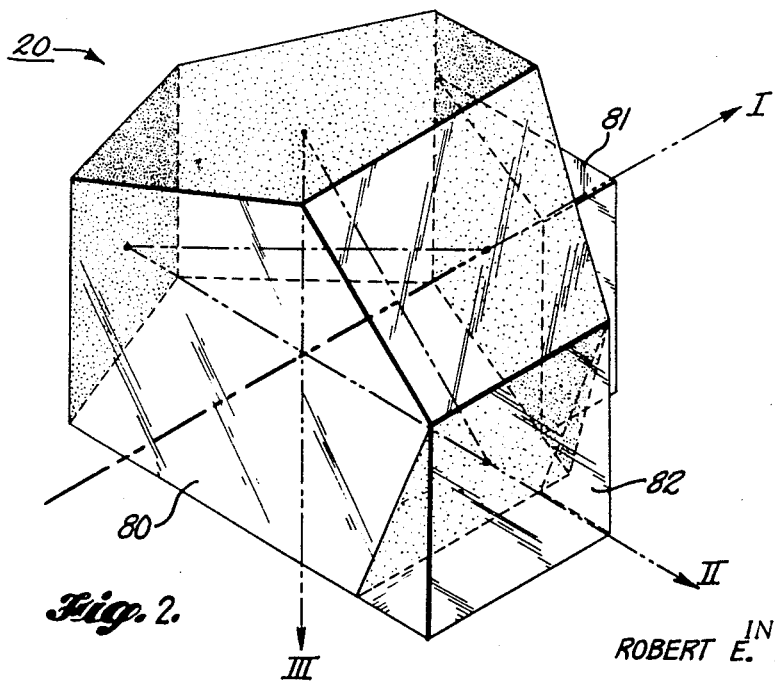

United States Patent Office 3,531,186
Patented Sept. 29, 1970

3,531,186
THREE-DIRECTIONAL OPTICAL ELEMENT
Robert E. Brasier, Seattle, Wash., assignor to The Boeing Company, Seattle, Wash., a corporation of Delaware
Original application Mar. 8, 1965, Ser. No. 437,705. Divided and this application Jan. 22, 1969, Ser. No. 793,071
Int. Cl. G02b 5/04
U.S. Cl. 350—286                              8 Claims

ABSTRACT OF THE DISCLOSURE

A novel optical element is described which receives light from three mutually perpendicular directions and causes the same to be directed along a single path. In one preferred embodiment the element is a polyhedron of light transmitting material having selected surfaces coated with a light reflecting material to cause the desired reflection of light within the element.

---

This application is a divisional of U.S. application Ser. No. 437,705 filed on Mar. 8, 1965, now Pat. No. 3,446,560.

The present invention relates to optical instruments adapted for use in optical tooling and more particularly to an improved optical element useful for simultaneously locating three mutually perpendicular axes.

Various types of optical devices have been devised and utilized for locating components in correct relationship to one another through the use of accurately established permanent reference points. It is common practice to locate three intersecting mutually perpendicular axes during the construction of large structures and assemblies such as aircraft, buildings, and others wherein extreme accuracy of the major axes must be maintained.

One of the most commonly utilized optical instruments for locating reference points along the referred to fixed axes is an optical square having the capability of locating two mutually perpendicular axes. In instruments of this type a conventional pentaprism is often used since such a prism has the characteristic that light received perpendicular to one of the faces of the pentaprism is reflected internally by the prism and so that it exits from the prism perpendicular to a second face which is at 90° with respect to the entrance surface. The light from the pentaprism is focused by a conventional telescope aligned with the exit plane so that an observer looking into the telescope can observe objects at 90° with respect to the telescope axis. In one type of optical apparatus an optical correction wedge is secured to the pentaprism in line with the telescope axis so that the user can also look in a straight line through the pentaprism and thus establish two mutually perpendicular axes. In order to locate the third axis the entire prism assembly is then rotated, which generally necessitates realignment of the "straight through" axis. Thus a plane substantially perpendicular to the telescope line of sight can be generated. In practice it is found that such rotation of the pentaprism tends to disrupt the previous alignment and hence reduce overall system accuracy. Thus it would be advantageous to have an instrument capable of locating three mutually perpendicular axes without the need for rotation of the optical instrument and associated readjustment of the system to overcome disruption of previous alignments.

It is therefore an object of the present invention to provide an improved optical element finding particular use in a device for locating three mutually perpendicular axes.

It is another object of the present invention to provide a novel three-directional optical square having the capability of receiving light from three mutually perpendicular directions and then for directing said light from the three mutually perpendicular directions along a common axis which is preferably parallel to one of the said three directions.

In accordance with the teachings of the present invention an optical piece is provided which can be referred to as a three-directional optical square since it has the capability of receiving light from three mutually perpendicular axes and directing such light along a common line parallel to one of the three axes and in a direction opposite thereto. Thus an alignment telescope positioned to receive such light permits the user to rapidly locate three mutually perpendicular axes without movement of the optical instrument or rotation of the optical element.

The prism or optical element is constructed from any suitable medium such as fused silica, fused quartz, or other material known per se in the art. First and second planar surfaces which are at 90° with respect to each other are provided, with one of the surfaces being oriented for the receipt of light perpendicular thereto and referred to as the bottom plane, the second surface being referred to as the light exit plane or surface. For ease of description the various planar surfaces will be referred to as planes. Third and fourth surfaces are cut on the optical element to define third and fourth planes at 45° with respect to each other and each perpendicular to said second or viewing plane. The third plane is cut at an angle of θ with respect to the first or bottom plane. Fifth and sixth surfaces of the prism are similarly planar surfaces each at 45° with respect to the other and each of said fifth and sixth planes being perpendicular to said first or bottom plane. The fifth plane intersects the second plane at said angle θ and also intersects the fourth plane. An optical wedge adhered to the third plane is so constructed that light traveling parallel to the first and second planes will pass through the wedge and said third planar surface and remain parallel to said first and second planes upon exiting from said third plane to the interior of the prism. The arrangement is such that light passes through the wedge, the third surface of the prism, is reflected by the fifth and sixth surfaces, and exits through the second surface at an angle of 90° with respect to its original direction. In a similar manner light traveling perpendicular to the bottom or first plane of the prism will enter the prism and undergo four reflections from the fourth, third, fifth, and sixth surfaces, respectively, and exit from the prism through the second plane at an angle of 90° with respect thereto. The said fourth and fifth surfaces are made substantially totally reflective to interior light while the third surface having the optical wedge secured thereto is only partially aluminized or silvered so that light can pass therethrough from the exterior of the optical element along one of the three mutually perpendicular axes and yet light reflected from the totally reflective fourth surface of the top of the optical prism will be reflected from the interior of the third surface.

A second optical wedge is adhered to the sixth surface of the optical element (which is opposite the second surface) so that light traveling parallel to the telescope line of sight will enter the sixth surface and exit perpendicular to the second surface. Since the sixth surface also acts as a reflector to internal light and yet transmits light from the exterior, it is also only partially reflective.

The optical element described above is advantageously used in combination with the improved holder disclosed and claimed in the above described application and which is adapted to selectively block the entrance of light along two of the three mutually perpendicular axes so that an observer will receive light from a single selected one of the three mutually perpendicular axes. A control arrangement in the form of a shutter system can be provided so that the operator can readily select which of the three entrance openings will be unblocked and hence will permit the user to select which of the three axes is to be located.

The above as well as additional advantages and objects of the present invention will be more clearly understood from the following description when read with reference to the accompanying drawings wherein:

FIG. 2 is an enlarged isometric view of the novel optical element shown as rotated 90° from the position it would occupy in FIG. 1;

FIG. 3 is a reduced top view of the optical element as shown in FIG. 2;

FIG. 4 is a reduced front view of the optical element as shown in FIG. 2; and

FIG. 5 is a reduced view from the right end of the optical element as shown in FIG. 2.

Figure 1:
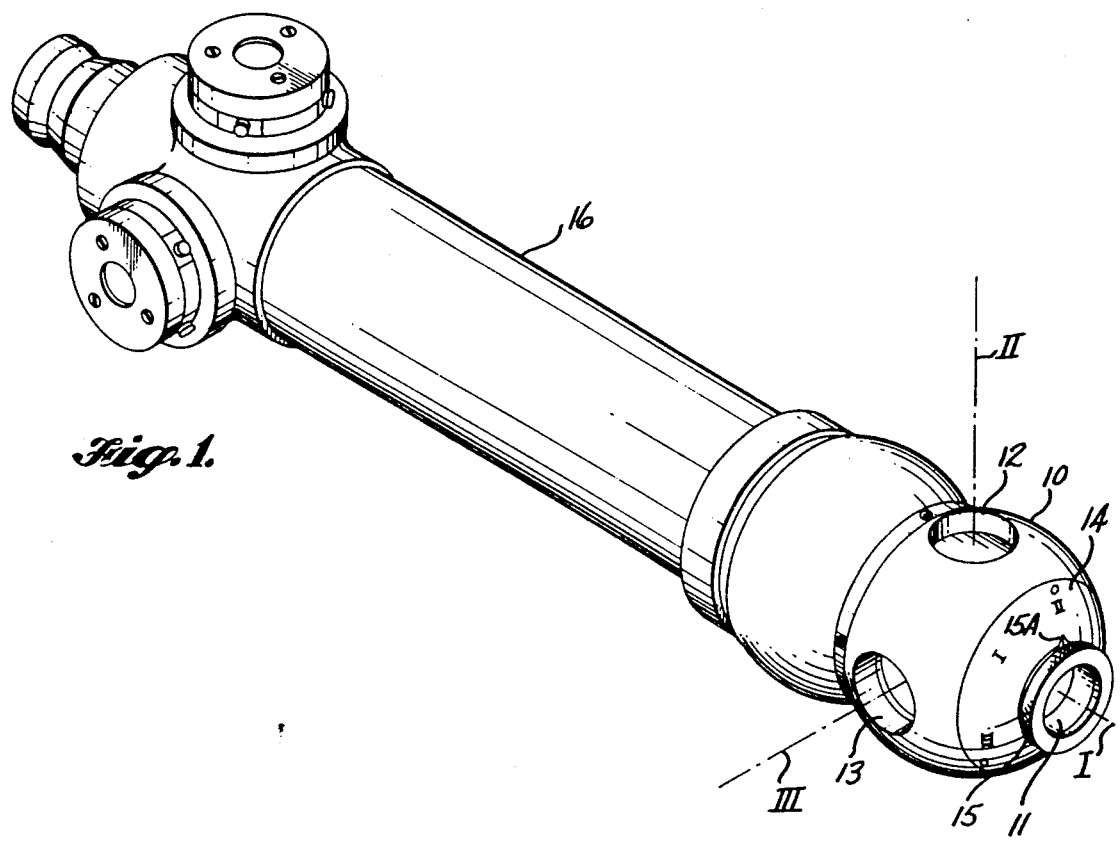
FIG. 1 is an isometric view of an improved optical alignment instrument utilizing the optical element of the present invention.

Referring now to the drawings and in particular to FIG. 1, the element of the present invention will be described as housed within the alignment instrument which includes a first spherical housing member 10 having three entrance openings 11, 12 and 13 so positioned that light from three mutually perpendicular directions can enter the spherical housing 10 along the three lines of sight indicated generally by the lines of sight I, II, and III. A hemispherical cap 14 is secured to and actually forms the front of the spherical housing member 10. The cap 14 not only supports a shutter adjustment knob 15 but also is part of the shutter mechanism and associated controls described in greater detail in application Ser. No. 437,705. The knob 15 has a pointer 15A which points to one of the markings "I," "II," or "III" to show the direction from which light is being directed to the telescope 16 attached to the housing 10.

In the use of an optical alignment instrument for locating three mutually perpendicular axes the operator sequentially sights along each of three mutually perpendicular lines of height and accurately locates the same by means of appropriate targets on which the telescope cross lines are focused. An apparatus permitting the operator to close two of the three openings, 11, 12 and 13 and simultaneously open a selected one thereof with a minimum of effort and without destroying the alignment of the instrument is disclosed in detail in the above identified application.

The improved optical element 20 (FIG. 2) disposed within the spherical housing 10 which permits the simultaneous location of three mutually perpendicular axes without movement of the alignment instrument is shown in greater detail in FIGS. 2, 3, 4 and 5. The optical element as shown in FIG. 2 is rotated 90° about the straight-through line of sight I from its position of FIG. 1 as an aid in teaching the construction details thereof. Referring now to FIGS. 2 through 5, it will be seen that the improved optical element 20 is a composite structure which acts as a two-direction pentaprism and includes a polyhedron 80 and a pair of truncated triangular prisms or optical wedges 81 and 82 permanently adhered thereto. While only six major surfaces of the eight-sided polyhedron 80 are actually used, the member 80 is preferably in the shape of an irregular eight-sided polyhedron for ease of construction and to minimize the physical size thereof for fitting within the spherical housing assembly previously described. The six surfaces of the polyhedron which are used for reflecting or transmitting light are designated as the surfaces 80A, 80B, 80C, 80D, 80E, and 80F. With the optical element in the position shown in FIG. 2, these surfaces can be referred to in general as the bottom, front, right end, top, left end, and rear surfaces, respectively, for convenience of description. Thus it will be seen that a bottom surface 80A is a flat planar surface having five edges and at an angle of 90° with respect to the second or front surface 80B which acts as the light exit surface through which light is transmitted to the alignment telescope 16. As seen most clearly in the front view of FIG. 4, the right end surface 80C if extended would intersect the plane of the top surface 80D at an angle indicated at 71 and equal to 45°. In a similar manner and as shown in the top view of FIG. 3, the fifth and sixth surfaces 80E and 80F if extended would intersect each other at an angle 70 which is also equal to 45°. The left end and top surfaces 80E and 80D are coated in a conventional manner with silver or aluminum so that each of said surfaces 80E and 80D is substantially 100% reflective to light impinging thereon from the interior of the polyhedron member. The right end and the rear surfaces 80C and 80F are made partially reflective so that light can enter therethrough from the exterior of the member and yet interior light reflected thereon from surfaces 80D and 80E, respectively, will be reflected therefrom in the manner described below. The truncated triangular prism members 81 and 82 are respectively secured to the surfaces 80F and 80C so that light can pass therethrough and through the surfaces 80C and 80F in a substantially undeviated path (or in a path such that the original direction thereof is undeviated).

As seen most clearly in FIG. 3, light traveling along the line of sight path II will pass through the optical wedge 82 and will enter the member 80 through the right end surface 80C. The arrangement is such that light traveling parallel to the planar surfaces 80A and 80B along the line of sight II will be reflected from the totally reflective surface 80E and directed against the partially reflective surface 80F. Since surfaces 80E and 80F form an angle of 45° the light will be reflected from surface 80E perpendicular to the line of sight II and will exit from the optical element in a direction perpendicular to the exit plane surface 80B.

Light traveling toward the optical element along the straight-through line of sight I passes through the first correction wedge 81, enters the member 80 through the partially silvered or aluminized rear surface 80F, and travels in a straight line through the member 80 to exit therefrom perpendicular to the exit plane surface 80B. In practice the outer surfaces 81A and 82A of the correction wedges 81 and 82 are perpendicular to each other and each is perpendicular to the bottom or first plane 80A.

Light traveling parallel to the third line of sight III (perpendicular to the bottom surface 80A) enters the member 80 through the bottom surface 80A, is reflected by the totally reflective interior surface of the top surface 80D, is directed against the partially coated surface 80C and is reflected therefrom parallel to the bottom plane since surfaces 80D and 80C are at 45° with respect to each other. Thus when the light is reflected from the interior of surface 80C it is parallel to the second line of sight II and will be reflected from the interior of surfaces 80E and 80F to exit from the optical element perpendicular to the exit plane 80B.

The various surfaces are so cut and the wedges 81 and 82 are appropriately adhered to the eight-sided polyhedron member 80 so that three mutually perpendicular axes indicated by the numerals I, II, and III intersect at a common point in the interior of the member 80. The point of intersection of the three mutually perpendicular axes is then positioned at the center of the sphere defined by the spherical housing member 10.

While not essential to the construction of a suitable piece of equipment, it is advantageous to utilize a 66% aluminum coating on the surface 80F and only a 50% coating on the surface 80C, that is, a ratio of about 1.32 to 1. By following this technique the intensity of the light received by the eye of the user will be substantially the same regardless of which of the three mutually perpendicular axes the viewer is then looking along since the differences in the amount of coating on the surfaces 80F and 80C will compensate for the differing number of reflections undergone by light entering the optical element along the different axes. The light entrance areas of the surfaces for light from along the axis I and II is also preferably the same, which also, due to the reflection from surface 80C of light entering the bottom plane 80A, serves to effectively equalize the light entrance area of the bottom plane.

From the above it will be seen that an improved optical element is provided which has the desirable characteristic of receiving light from three mutually perpendicular axes and directing the same therefrom along a single axis with three mutually perpendicular axes intersecting at the interior of the optical element. The optical element is securely positioned within the spherical housing 10.

There has thus been described an improved optical element. While the improved optical element has been described by reference to a preferred embodiment thereof making use of a pair of optical correction wedges, it should be mentioned that the manufacturing tolerances of the optical element can be relaxed if various correction wedges are utilized in combination with the polyhedron member. In one element constructed in accordance with the present invention the interior angles between the planes of surfaces 80B and 80E, and between 80A and 80C, were each made equal to 112½° to maximize the light transmission paths through the element. While the invention has been described by reference to a preferred embodiment thereof, those changes and modifications which will become obvious to a person skilled in the art as a result of the teachings hereof are intended to be encompassed by the following claims.

What is claimed is:

1. An optical assembly for receiving light from first, second, and third mutually perpendicular directions and directing the same in a fourth direction opposite to said first direction, comprising in combination: means defining a first planar reflecting surface for reflecting light received from said second direction; means defining a second planar reflecting and light transmitting surface positioned at an angle of 45° with respect to said first surface and adapted to reflect in said fourth direction light traveling in said second direction and reflected by said first surface onto said second surface, said second surface being adapted to permit the passage of light therethrough received from said first direction; means defining a fourth planar reflecting surface positioned to reflect light received from said third direction; and means defining a fourth planar reflecting and light transmitting surface positioned at an angle of 45° with respect to said third surface and adapted to reflect in said second direction and toward said first surface light received by said third surface from said third direction and reflected against said fourth surface, said fourth surface being adapted to transmit therethrough light traveling in said second direction toward said first surface.

2. An optical assembly as defined in claim 1 wherein each of said means defining a planar surface comprises a surface of a poyhedron member of light transmitting material having planar surfaces corresponding respectively to said first, second, third and fourth surfaces and having metallic coating means thereon to provide the said respective reflective and combination reflective and transmissive characteristics.

3. An optical assembly as defined in claim 1 wherein said polyhedron member has fifth and sixth mutually perpendicular light transmitting planar surfaces which are respectively perpendicular to said first and third directions and respectively opposite said second and third surfaces.

4. An optical element comprising: optical means defining a polyhedron member having first and second planar light transmitting surfaces intersecting at an angle of 90°, third and fourth planar surfaces disposed at an angle of 45° with respect to each other, said fourth surface being opposite said first surface and adapted to reflect light passing through said first surface, said third surface being adapted to reflect light directed thereon from said fourth surface and to transmit light from the exterior of the optical element to the interior thereof, said third surface intersecting said second surface at an angle of 90° and said first surface at an angle $\theta$, fifth and sixth planar surfaces disposed at an angle of 45° with respect to each other with said fifth surface being disposed opposite said third surface and adapted to reflect light received therefrom against said sixth surface, said fifth surface intersecting said first surface at an angle of 90° and said second surface at an angle $\theta$, said sixth surface being opposite said second surface and adapted to reflect light received from said fifth surface and to transmit light received from the exterior thereof and traveling toward said second surface, and optical correction means aligned with said third and with said sixth surfaces.

5. An optical element as defined in claim 4 wherein said angle $\theta$ is equal to said angle $\phi$ and wherein said optical correction means includes first and second optical wedges respectively aligned with said third and sixth surfaces.

6. An optical element as defined in claim 4 wherein said angle $\theta$ and $\phi$ are each equal to 112½°.

7. An optical element as defined in claim 4 wherein said optical correction means includes a first optical wedge having a first planar surface adhered to said third surface of said polyhedron member and a second planar surface opposite thereto perpendicular to said first and second surfaces of said polyhedron member, and a second optical wedge having a first planar surface adhered to said sixth surface of said polyhedron member and a second planar surface opposite thereto and respectively perpendicular and parallel to said first and second surfaces of said polyhedron member.

8. An optical element as defined in claim 7 wherein said third and sixth surfaces are partially metallized to thereby be partially reflective and partially transmissive surfaces.

References Cited

UNITED STATES PATENTS

| | | |
|---|---|---|
| 1,616,279 | 2/1927 | Parodi. |
| 3,333,053 | 7/1967 | Back. |

DAVID SCHONBERG, Primary Examiner

M. J. TOKAR, Assistant Examiner

U.S. Cl. X.R.

350—174

PO-1050
(5/69)

UNITED STATES PATENT OFFICE
CERTIFICATE OF CORRECTION

Patent No. 3,531,186      Dated September 29, 1970

Inventor(s) Robert E. Brasier

It is certified that error appears in the above-identified patent and that said Letters Patent are hereby corrected as shown below:

In claim 4, line 18, the symbol "θ" has been corrected to read -- φ --.

Signed and Sealed Nov 24 1970

(SEAL)
Attest:

Edward M. Fletcher, Jr.
Attesting Officer

WILLIAM E. SCHUYLER, JR.
Commissioner of Patents